(12) United States Patent
Himono

(10) Patent No.: US 11,978,194 B2
(45) Date of Patent: May 7, 2024

(54) DATA ANALYSIS SYSTEM, DATA ANALYSIS METHOD, AND NON-TRANSITORY COMPUTER-READABLE MEDIUM

(71) Applicants: YOKOGAWA ELECTRIC CORPORATION, Tokyo (JP); Yokogawa Solution Service Corporation, Tokyo (JP)

(72) Inventor: Ryoichi Himono, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 252 days.

(21) Appl. No.: 17/231,494

(22) Filed: Apr. 15, 2021

(65) Prior Publication Data
US 2021/0334947 A1 Oct. 28, 2021

(30) Foreign Application Priority Data
Apr. 27, 2020 (JP) ................... 2020-078581

(51) Int. Cl.
*G06T 7/00* (2017.01)
(52) U.S. Cl.
CPC .......... *G06T 7/001* (2013.01); *G06T 2200/24* (2013.01); *G06T 2207/20081* (2013.01); *G06T 2207/30164* (2013.01)
(58) Field of Classification Search
CPC .............. G06T 7/001; G06T 2200/24; G06T 2207/20081; G06T 2207/30164; G06Q 10/06393; G06F 16/22; G06N 20/00
See application file for complete search history.

(56) References Cited

U.S. PATENT DOCUMENTS

2019/0129402 A1  5/2019 Kawano

FOREIGN PATENT DOCUMENTS

| JP | 2006-293658 A | 10/2006 |
| JP | 5956094 B1 * | 7/2016 |
| JP | 2016-177794 A | 10/2016 |
| JP | WO 2018078903 A1 * | 5/2018 |
| JP | 6481916 B1 * | 3/2019 |
| WO | 2019-220481 A1 | 11/2019 |

* cited by examiner

*Primary Examiner* — Samir A Ahmed
(74) *Attorney, Agent, or Firm* — Osha Bergman Watanabe & Burton LLP

(57) ABSTRACT

A data analysis system includes: a memory; and a processor connected to the memory and that acquires data to be analyzed. The data to be analyzed includes parameters relating to a production element of a product produced in each of production batches; and an indicator for evaluating the product. The processor outputs, to the memory, the acquired data to be analyzed. The memory stores, in each of the production batches, the parameters and the indicator associated with the parameters. The processor calculates a correlation feature value for each of the production batches based on a correlation between the parameters and data of the correlation and the parameters. The processor causes a display to display the calculated feature value.

3 Claims, 12 Drawing Sheets

| Production Batch Information | Parameter 1 | * * * | Parameter 500 | Indicator Information |
|---|---|---|---|---|
| | | | | Good |
| | | | | Bad |
| | | | | Good |
| | | | | * * * |

FIG. 2

| Production Batch Information | Parameter 1 | ... | Parameter 500 | Indicator Information |
|---|---|---|---|---|
| | | | | Good |
| | | | | Bad |
| | | | | Good |
| | | | | ... |

FIG. 6

| Production Batch Information | Parameter 1 | ... | Parameter 500 | Correlation Feature Value of Parameter 1 and Parameter 2 | Indicator Information |
|---|---|---|---|---|---|
| | | | | | Good |
| | | | | | Bad |
| | | | | | Good |
| | | | | | ... |

FIG. 7

| Production Batch Information | Parameter 1 | ... | Parameter 500 | Correlation Feature Value of Parameter 1 and Parameter 2 | ... | Correlation Feature Value of Parameter 499 and Parameter 500 | Indicator Information |
|---|---|---|---|---|---|---|---|
| | | | | | | | Good |
| | | | | | | | Bad |
| | | | | | | | Good |
| | | | | | | | ... | g51

DATA ANALYSIS SYSTEM, DATA ANALYSIS METHOD, AND NON-TRANSITORY COMPUTER-READABLE MEDIUM

BACKGROUND

Technical Field

The present invention relates to a data analysis system, a data analysis method, and a non-transitory computer-readable medium.

Related Art

According to conventional art, when some sort of indicator (for example, quality) is sometimes good and sometimes bad as a result of a sequence of operations performed repeatedly, such as a manufacturing process performed at a factory, past data may be analyzed to narrow down factors from when the indicator was bad to stabilize product performance and manufacturing performance.

For example, Patent Document 1 discloses art for defining inhibitive factors that produce variations in product performance and art for stabilizing product performance and manufacturing performance. Specifically, in the art disclosed in Patent Document 1, a production batch of a manufacturing process is divided into several groups from a primary component score generated based on process data, merits and demerits of the several groups are determined based on product data, an inhibitive factor contributing to the merits and demerits of the group is defined, and product performance and manufacturing performance are stabilized.

PATENT DOCUMENTS

Patent Document 1 JP 2016-177794 A

In conventional art, in order to analyze past data and narrow down a factor from when an indicator was bad, it is necessary to narrow down which parameter from among observed parameters (for example, temperature, operator, operation time period, or the like) influences whether the indicator is good/bad. However, in conventional art, which parameter influences whether the indicator is good/bad cannot be narrowed down when there are many parameters. Furthermore, in conventional art, when there are few production batches (for example, lots) in the analysis data, analysis precision does not improve.

SUMMARY

One or more embodiments provide a data analysis system, a data analysis method, and instructions capable of narrowing down a parameter that influences whether an indicator is good/bad even when there are few production batches or there are many parameters.

A data analysis system according to one or more embodiments includes: a data acquisition unit (i.e., processor) for acquiring data to be analyzed wherein parameters relating to a production element of a product produced in each production batch and an indicator for evaluating the product are associated to each of the production batches; and a correlation feature value extraction unit (i.e., processor) for calculating a correlation feature value for each of the production batches based on a correlation between the parameters and based on data of the correlation and the parameters.

Furthermore, the data analysis system according to one or more embodiments may be configured such that the correlation feature value extraction unit selects two or more pairs of the parameters from among the data to be analyzed, extracts data of the production batch wherein the indicator fulfills a standard stipulated in advance from among data of the selected pairs of parameters, uses the extracted data to calculate an approximation showing a correlation of the selected pair of parameters, and calculates for each of the production batches a correlation feature value showing a distance between the data of the selected pair of parameters and the approximation.

Furthermore, the data analysis system according to one or more embodiments may include a parameter extraction unit (i.e., processor) for extracting the parameters which influence the indicator based on the calculated correlation feature values.

Furthermore, the data analysis system according to one or more embodiments may be configured such that the parameter extraction unit extracts the parameters which influence the indicators based on the correlation feature values using machine learning.

A data analysis method according to one or more embodiments causes a data analysis system to acquire data to be analyzed wherein parameters relating to a production element of a product produced in each production batch and an indicator for evaluating the product are associated to each of the production batches, and calculate a correlation feature value for each of the production batches based on a correlation between the parameters and based on data of the correlation and the parameters.

A non-transitory computer-readable medium according to one or more embodiments causes a computer to acquire data to be analyzed wherein parameters relating to a production element of a product produced in each production batch and an indicator for evaluating the product are associated to each of the production batches, and calculate a correlation feature value for each of the production batches based on a correlation between the parameters and based on data of the correlation and the parameters.

According to one or more embodiments, correlation feature values representing a correlation of a pair of parameters are used, and therefore, parameters influencing whether the indicator is good/bad can be narrowed down even when there are few production batches or there are many parameters.

BRIEF DESCRIPTION OF THE DRAWINGS

FIG. 2 is a diagram showing an example of data acquired by a data acquisition unit and stored in a database according to one or more embodiments.

FIG. 6 is a diagram showing an example of data after correlation feature values are added to a database according to a combination of one pair of parameters according to one or more embodiments.

FIG. 7 is a diagram showing an example of data after correlation feature values are added to a database according to all combinations of parameters according to one or more embodiments.

DETAILED DESCRIPTION

In one or more embodiments, when some sort of indicator (a label related to quality, for example, quality) is sometimes good (for example, a production batch (for example, lot)) and sometimes bad as a result of a sequence of operations performed repeatedly such as a manufacturing process performed at a factory, past data is analyzed to narrow down factors from when the indicator was bad. Note that an indicator being bad means, for example, delivery standards not being met at the time of a delivery inspection, and an indicator being good means, for example, delivery standards being met at the time of a delivery inspection.

One or more embodiments will be described below with reference to drawings.

Figure 1:
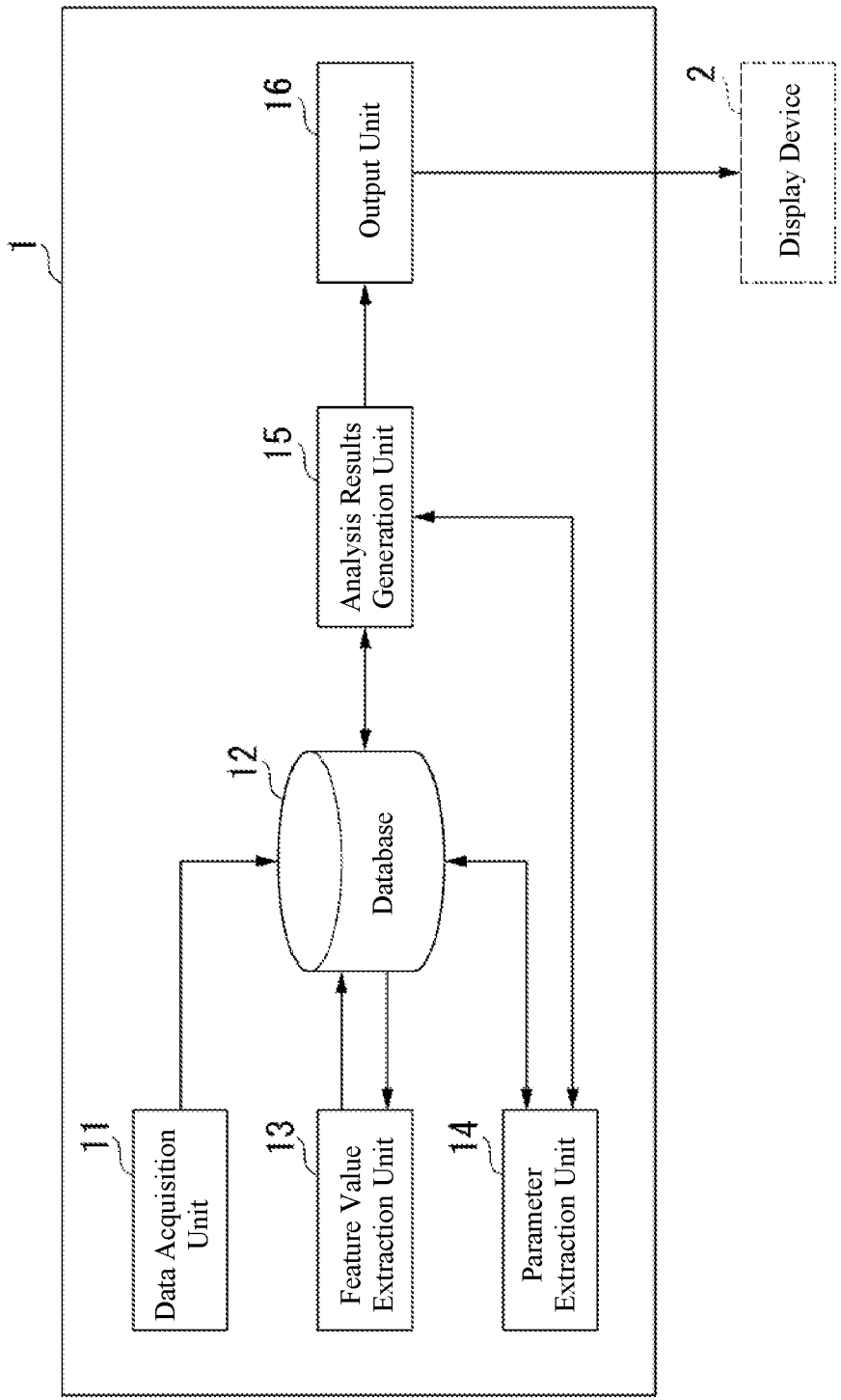
FIG. 1 is a block diagram illustrating an example of a configuration of a data analysis system according to one or more embodiments.

FIG. 1 is a block diagram illustrating an example of a configuration of a data analysis system 1 according to one or more embodiments. As seen in FIG. 1, the data analysis system 1 includes a data acquisition unit 11, a database 12, a feature value extraction unit 13, a parameter extraction unit 14, an analysis results generation unit 15, and an output unit 16. Note that the database 12 may be on a cloud via a network. Furthermore, a display device 2 is connected to the data analysis system 1. Note that in the description below, a manufacturing process performed in a factory will be described in an example. Furthermore, in one or more embodiments, a lot per predetermined production quantity or per production volume is described in an example as one example of a production batch in the manufacturing, but the production batch is not limited to a lot. The production batch may be per predetermined quantity, per date, per time, per manufacturer shift, per production batch of material used in manufacturing.

The display device 2 is, for example, a liquid crystal image display device, an organic EL (Electro Luminescence) image display device, or the like. The display device 2 displays image information output by a data analysis system 1.

The data analysis system 1 analyzes acquired data relating to the manufacturing to estimate parameters which influences an indicator for manufacturing. Indicator means, for example, quality inspection results in a manufacturing process, and means, for example, quality, production volume, cost, time spend on production, and the like. In the example below, indicators will be described in an example wherein, when performance or the like of a manufactured product is evaluated, a case where a determination value is met or exceeded is "good" (first indicator), and a case where the determination value is not met is "bad" (second indicator). Parameter means a factor (production element) capable of influencing an indicator of a manufactured product during the manufacturing process, such as variables relating to the four elements of production (materials, equipment, processes, people). As one example, a parameter is temperature during heating, heating time, temperature during cooling, cooling time, components of materials, or the like. Note that the indicator may be a label such as, for example, the foregoing "good" and "bad", or it may be a numerical value.

The data acquisition unit 11, for example, reads data of a production batch and stores the read data in the database 12. Note that the data includes information indicating the production batch (hereafter, referred to as production batch information), a plurality of parameters, and information indicating the indicator (hereinafter, referred to as indicator information). Production batch information means, for example, a minimum batch of products defined by a manufacturing side in the manufacturing process. Furthermore, the acquired data is data to be subject to analysis.

The database 12 associates and stores a plurality of parameters and indicator information to production batch information. Note when that the database 12 stores information for a plurality of products, it associates and stores a plurality of parameters and indicator information to production batch information for each product.

The feature value extraction unit 13 uses the data for production batches, which is stored in the database 12 by the data acquisition unit 11, as input data and extracts feature values of a correlation between each parameter. The feature value extraction unit 13 associates extracted feature values of the correlation between each parameter to the plurality of parameters and the indicator information associated to the production batch information and stores these on the database 12. Note that the feature values of the correlation between each parameter and the calculation method for feature values will be described later.

The parameter extraction unit 14 extracts parameters or correlation feature values which influence whether the indicator is good/bad from among the parameters and correlation feature values thereof via, for example, machine learning, and the extracted extraction results are output to the analysis results generation unit 15. Note that the extraction method for parameters or correlation feature values which influence whether the indicator is good/bad will be described later.

The analysis results generation unit 15, for example, creates a graph image based on the extraction results output by the parameter extraction unit 14 and outputs the created graph image to the output unit 16.

The output unit 16 displays the graph image output by the analysis results generation unit 15 on the display device 2.

<Acquired Data Example>

Next, an example of data acquired by the data acquisition unit 11 and stored in the database 12 will be described. FIG. 2 is a diagram showing an example of data acquired by a data acquisition unit 11 and stored in a database 12 according to one or more embodiments. As seen in FIG. 2, the data acquired by the data acquisition unit 11 and stored in the database 12 associates 500 parameters and indicator information to production batch information. Note that the example shown in FIG. 2 is one example, and the number of parameters may be a number corresponding to the environment to be analyzed. Furthermore, the indicator information is also one example, and it is not limited to this.

<Feature Value Extraction Method Example>

Figure 3:
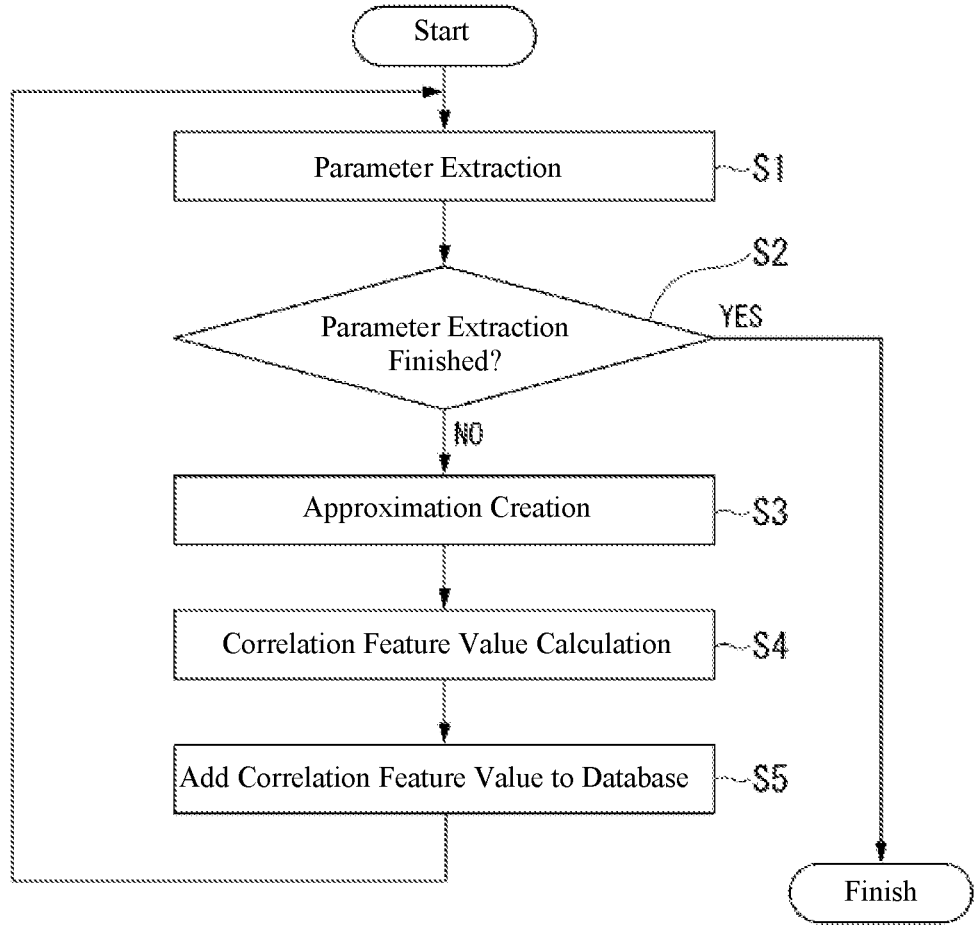
FIG. 3 is a flowchart of a feature value extraction procedure according to one or more embodiments.

Next, a feature value extraction method example will be described using FIG. 3 to FIG. 7. First, a feature value extraction procedure example will be described using FIG. 3. FIG. 3 is a flowchart of a feature value extraction procedure according to one or more embodiments.

(Step S1) The feature value extraction unit 13 sequentially performs extraction of two parameters per production batch for each combination of parameters from the data stored in the database 12. When, for example, the number of parameters is 500, the feature value extraction unit 13 extracts 124,750 times (=500×499÷2) per production batch. Note that the feature value extraction unit 13 performs similar processing for each production batch.

(Step S2) The feature value extraction unit 13 discriminates whether extraction processing of pairs of parameters for each production batch is finished. When the feature value extraction unit 13 discriminates that the extraction processing of pairs of parameters for each production batch is finished (step S2; YES), it finishes processing. When the feature value extraction unit 13 discriminates that the extraction processing of pairs of parameters for each production batch is not finished (step S2; NO), it proceeds to the processing in step S3.

Figure 4:
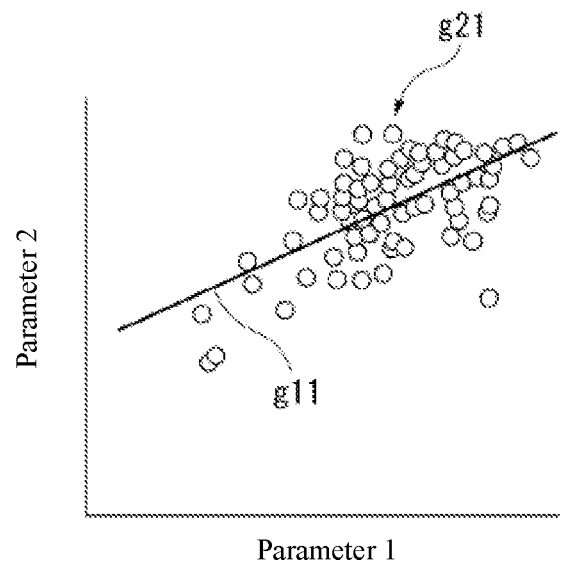
FIG. 4 is a diagram showing an example of a calculation of an approximation according to one or more embodiments.

(Step S3) With respect to the two parameters extracted in step S1, the feature value extraction unit 13 extracts only production batches wherein the indicator information is "good" and calculates an approximation of a correlation using coordinates in a correlation diagram of the extracted production batch data. That is, the feature value extraction unit 13 extracts, from among data of pairs of selected parameters, production batch data wherein the indicator meets or exceeds a standard stipulated in advance, or in other words, extracts only production batch data wherein the indicator information is a first indicator ("good", first group), and finds the approximation. The standard in this example is "good", and indicates that the quality of the product satisfies a standard stipulated in advance. FIG. 4 is a diagram showing an example of a calculation of an approximation according to one or more embodiments. In FIG. 4, the horizontal axis is parameter 1 (for example, a value of 0 to 10), and the vertical axis is parameter 2 (for example, a value of 0 to 10). The example in FIG. 4 is an example which only plots data g21 of production batches wherein the indicator information is "good" for parameter 1 and parameter 2, and, for example, uses the method of least squares to perform a first approximation and calculate an approximation g11.

Figure 5:
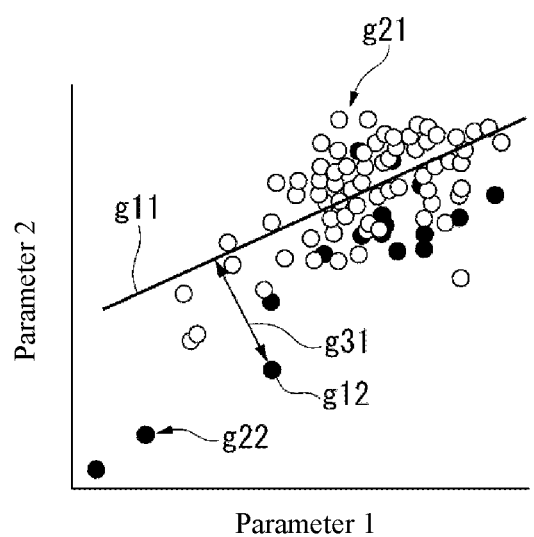
FIG. 5 is a diagram showing an example of an extraction method for feature values according to one or more embodiments.

(Step S4) The feature value extraction unit 13 calculates a distance from the created approximation and plotted points per production batch in the correlation diagram of the two parameters for all data and sets the calculated distances as a feature value. Hereinafter, this feature value will be referred to as a correlation feature value. That is, the feature value extraction unit 13 calculates the distance between the approximation and, respectively, the data of production batches of the first indicator (first group) and data of the production batches of a second indicator, which is the remaining indicator (second group). FIG. 5 is a diagram showing an example of an extraction method for feature values according to one or more embodiments. Each axis in FIG. 5 is the same as in FIG. 4. As can be seen in FIG. 5, when correlating feature values, the feature value extraction unit 13 uses not only the data g21 of production batches wherein the indicator information is "good", but also uses data g22 of production batches wherein the indicator information is "bad". In FIG. 5, a correlation feature value g31 is the distance between the approximation g11 and data g12 of a production batch n. Note that the distance is the length of a perpendicular line from the approximation g11 to the data (g21, g22). Note that the feature value extraction unit 13 calculates a distance d between the linear line of the approximation g11 and the data using a formula for distance between a point and a line.

(Step S5) The feature value extraction unit 13 adds the calculated correlation feature values to a table of production batches in the database 12. FIG. 6 is a diagram showing an example of data after correlation feature values are added to a database 12 according to a combination of one pair of parameters according to one or more embodiments. In the example in FIG. 6, the correlation feature value of parameter 1 and parameter 2 is added to the database 12. The feature value extraction unit 13 returns the processing to step S1.

Note that, as seen in FIG. 5, when the distance of the indicator information "bad" is further than the distance of the indicator information "good", in other words, when the correlation feature value of the indicator information "bad" is larger than the feature value of the indicator information "good", parameter 1 and parameter 2 have a large influence on whether the indicator information is good/bad. Parameters having a large influence on the indicator in this manner are narrowed down by the parameter extraction unit 14.

FIG. 7 is a diagram showing an example of data after correlation feature values are added to a database 12 according to all combinations of parameters according to one or more embodiments. As seen in FIG. 7, the feature value extraction unit 13 adds correlation feature values according to all combinations of parameters to the database 12. For example, when the number of parameters is 500, 124,750 correlation feature values g51 between each parameter (correlation feature value between parameter 1 and parameter 2, correlation feature value between parameter 1 and parameter 3, . . . correlation feature value between parameter 499 and parameter 500) is recorded for each production batch.

<Parameter Narrowing Down Results Example>

Figure 8:
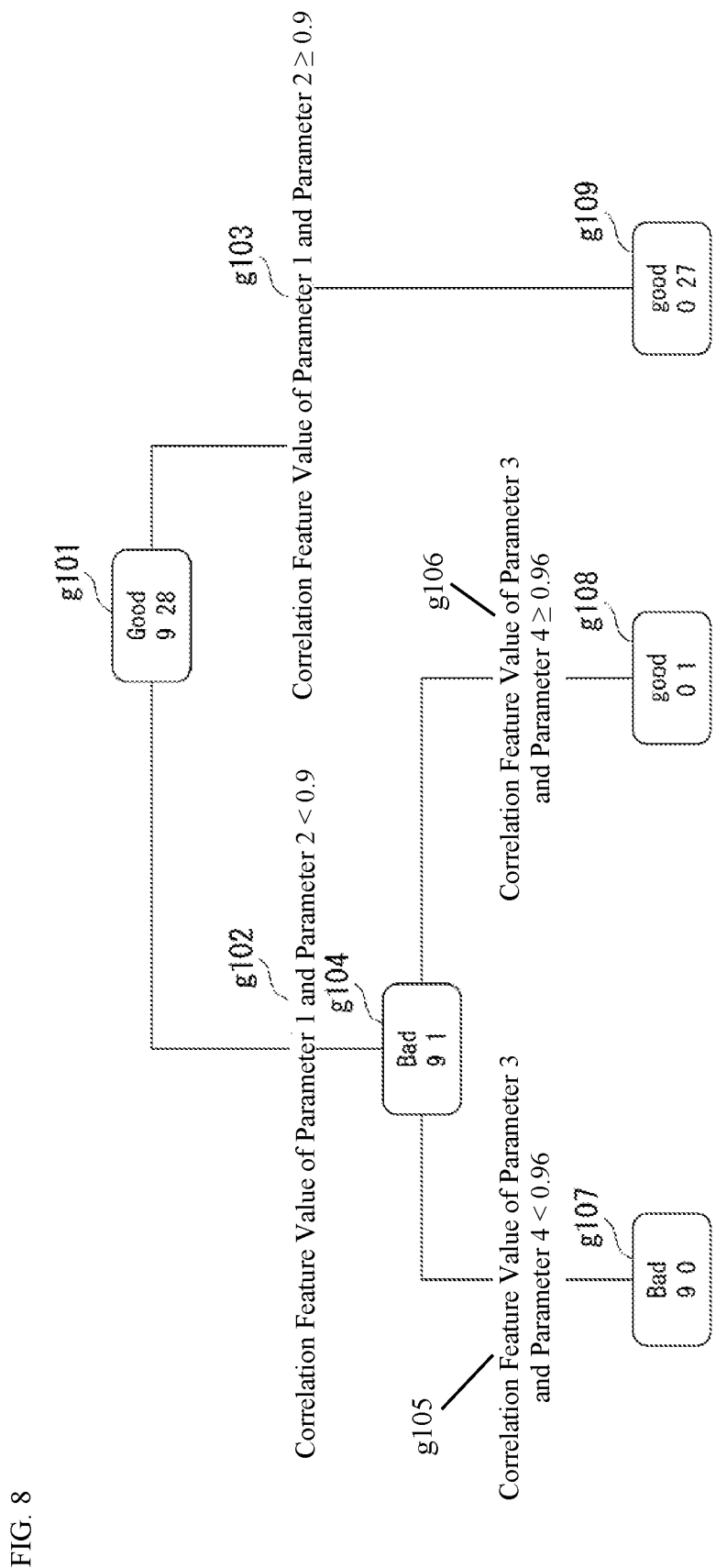
FIG. 8 is a diagram showing an example of results of narrowing down parameters according to one or more embodiments.

Next, an example of a method for narrowing down parameters will be described. FIG. 8 is a diagram showing an example of results of narrowing down parameters according to one or more embodiments. The example in FIG. 8 shows an example of the results of narrowing down which parameter or correlation feature value from among several hundred parameters or correlation feature values thereof influence whether the indicator is good/bad. In the example in FIG. 8, there are 37 production batches; 28 production batches have indicator information that is good and 9 production batches are bad (reference numeral g101). Note that at reference numerals g101, g104, g107, g108, and g109, the value on the left represents the number of production batches wherein the indicator information is bad, and the value on the right represents the number of production batches wherein the indicator information is good.

The parameter extraction unit 14 sets a threshold value for the correlation feature value of parameter 1 and parameter 2 to a value that separates "good" and "bad" the most. Next, the parameter extraction unit 14 separates between values of the correlation feature values of parameter 1 and parameter 2 that are less than 0.9 (reference numeral g102) and values of the correlation feature values of parameter 1 and parameter 2 that are 0.9 or greater (reference numeral g103). As a result, it is shown that it is possible to differentiate between the 27 production batches wherein the indicator information is good (reference numeral g109), and the 1 production batch wherein the indicator information was good and the 9 production batches wherein the indicator information was bad (reference numeral g104).

It is shown that the parameter extraction unit 14 can separate the 10 production batches (=9+1) of reference numeral g104 into values of the correlation feature values of parameter 3 and parameter 4 that are less than 0.96 (reference numeral g105) and values of the correlation feature values of parameter 3 and parameter 4 that are 0.96 or greater (reference numeral g106). Moreover, it is shown that it is possible to differentiate between the 9 production batches wherein the indicator information was bad (reference numeral g107) and the 1 production batch wherein the indicator information was good (reference numeral g108). Moreover, it is shown that when it is not possible to separate "good" and "bad" in one round of processing, it is possible to separate using the correlation feature value of a pair of parameters that are different from the first round of processing.

Accordingly, in FIG. 8, setting the correlation feature value=0.9 of parameter 1 and parameter 2 as a boundary can substantially divide the good/bad indicator information, and therefore, it is understood that parameter 1 and parameter 2 have a large influence on the indicator information. Moreover, according to FIG. 8, g104, which could not be separated by only the correlation feature value of parameter 1 and parameter 2, can be separated by further setting the correlation feature value 0.96 of parameter 3 and parameter 4 as a boundary, and therefore it is understood that parameter 3 and parameter 4 influence the indicator information. That is, the example of FIG. 8 shows that the good/bad indicator information could be substantially separated by parameter 1 and parameter 2 and that it could be further completely separated by parameter 3 and parameter 4. Specifically, the factor for indicator information being "bad" is when the correlation feature value of parameter 1 and parameter 2 is less than 0.9 and when the correlation feature value of parameter 3 and parameter 4 is less than 0.96. Note that such a threshold value (0.9, 0.96) can also be estimated by a first learning unit (FIG. 9) provided to the parameter extraction unit 14.

Note that in the separation example shown in FIG. 8, the threshold value, two parameters, number of production batches, and the like are one example, and are not limited to this. For example, if the indicator information has a group 1, a group 2, and a group 3, then it may be separated into three.

Figure 9:
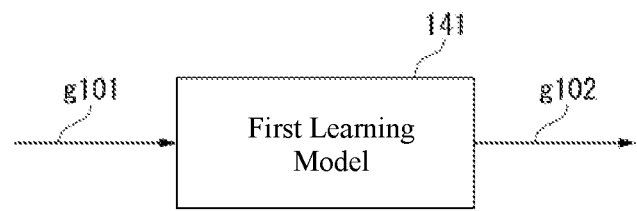
FIG. 9 is a diagram illustrating an example of a first learning model provided to a parameter extraction unit according to one or more embodiments.

The parameter extraction unit 14, for example, uses a first learning model generated by machine learning to perform this sort of separation processing. FIG. 9 is a diagram illustrating an example of a first learning model 141 provided to a parameter extraction unit 14 according to one or more embodiments. At the time of learning for the first learning model 141, the input g101 is data associating the production batch information, parameter information, indicator information, and correlation feature values, and the output g102 is at least one among parameters, correlation feature values, and information relating to a decision tree such as that in FIG. 8 which have a large influence on the indicator. Note that, at the time of learning, training data may be results (parameters having a large influence on the indicator) analyzed in the past by an analyst, for example. Note that the method for using machine learning is, for example, the MT method, deep learning, or the like.

Note that in the foregoing examples, an example is described wherein the parameter extraction unit 14 uses a first learning model 141 that it is provided with to output a decision tree as in FIG. 8, but it is not limited to this. The parameter extraction unit 14 may select pairs of parameters one pair at a time and set a threshold value having the best separation for the correlation feature value of a pair of parameters for each selected pair of parameters. For example, when the range of the value of the correlation feature value of parameter 1 and parameter 2 are from 0 to 1, the parameter extraction unit 14 may increase the threshold value from 0 to 1 by 0.01 at a time. Furthermore, when separations are made using all threshold values, the parameter extraction unit 14 may select the threshold value capable of separating the indicator information the most. When the indicator information cannot be completely separated, the parameter extraction unit 14 may select another pair of parameters and find a threshold value. The parameter extraction unit 14 may repeat this manner of processing to find a decision tree as in FIG. 8.

As a result, the output unit 16 may display the parameters and threshold values estimated to influence the indicator (for example, FIG. 8), the correlation diagram according to combinations of parameters, the correlation feature values according to these combinations of parameters, and the like on the display device 2. Alternatively, the output unit 16 may display information relating to the decision tree as in FIG. 8 on the display device 2. A user can see the results as in FIG. 8 to establish a countermeasure strategy, such as first performing countermeasures for parameter 1 and parameter 2, and as a result, if an adequate number of production batches having desirable quality still cannot be obtained, then performing countermeasures for parameter 3 and parameter 4.

Thus, according to one or more embodiments, it is possible to extract data which meets or exceeds the standard (for example, the "good" indicator) (remove data which is at or below the standard (for example, the "bad" indicator)), use an effective feature value calculated using the created approximation in order to perform machine learning even with a small number of production batches, and thereby precisely estimate parameters which influence the indicator.

Comparative Example

Next, a comparative example will be described using FIG. 10 to FIG. 13.

Figure 10:
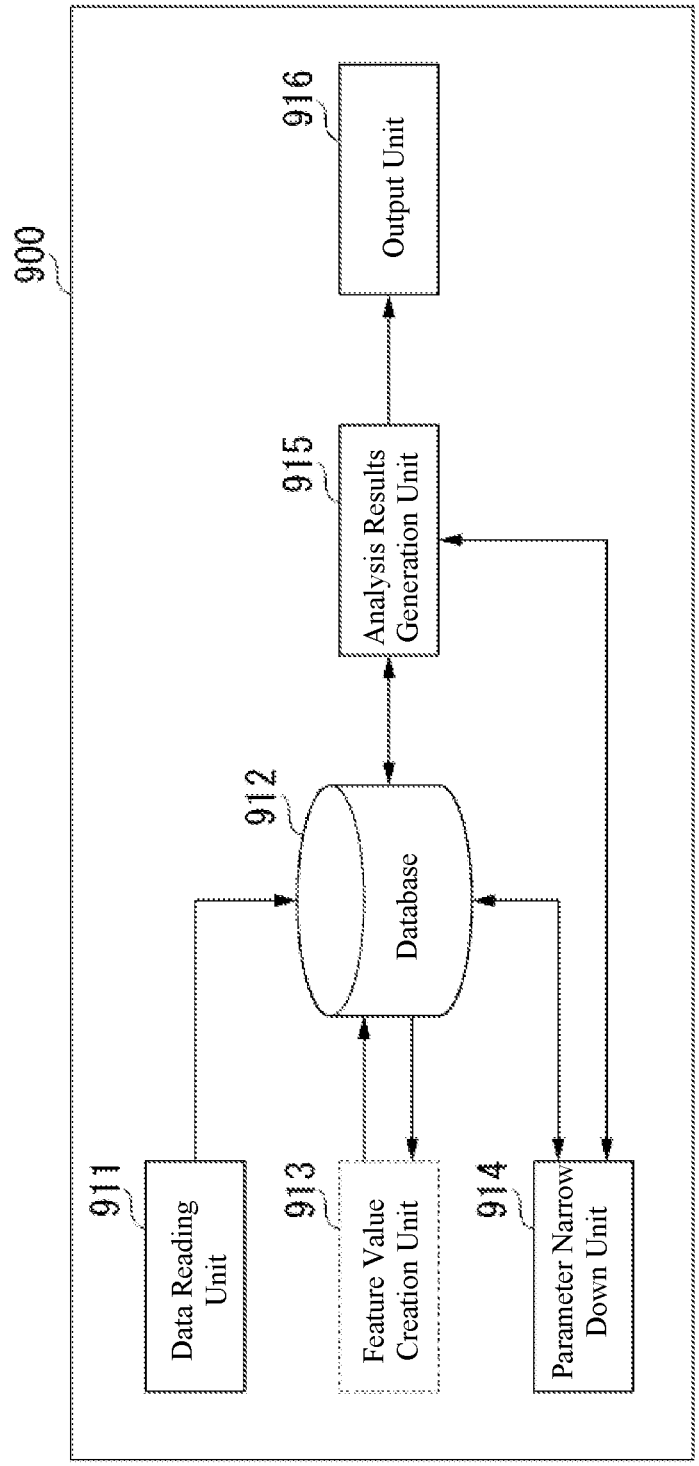
FIG. 10 is a block diagram illustrating a configuration of a data analysis system according to a comparative example.

FIG. 10 is a block diagram illustrating a configuration of a data analysis system 900 according to a comparative example. As seen in FIG. 10, the data analysis system 900 includes a data reading unit 911, a database 912, a parameter narrow down unit 914, an analysis results generation unit 915, and an output unit 916.

The data reading unit 911, for example, reads data of a production batch and stores the read data in the database 912. Note that the acquired data is similar to the above embodiments.

The database 912 associates and stores a plurality of parameters and indicator information to production batch information.

A feature value creation unit 913 creates feature values which seem to influence the indicator from read parameter values. Note that an analysis supervisor sets the feature. However, what should be set as a feature depends on the knowledge of the analysis supervisor, and if they have no know-how in the domain subject to analysis, feature values tied to effective information cannot be defined. The feature values, for example, are trend data when the process in continuous in manufacturing, and are the maximum value, minimum value, standard deviation, slope, and the like.

The parameter narrows down unit 914 adds created feature values to the read parameters, and narrows down parameters (including feature values) which influence whether the indicator is good/bad from among these using, for example, machine learning. The parameter narrows down unit 914 outputs the results of the machine learning in order of most likely to be able to discriminate, for example, which combination of parameters can discriminate whether the indicator is good/bad.

The analysis results generation unit 915, for example, converts a distribution of a parameter to a graph and outputs the graph image converted to a graph to the output unit 916.

The output unit 916 displays the graph image output by the analysis results generation unit 915 on the display device.

Figure 11:
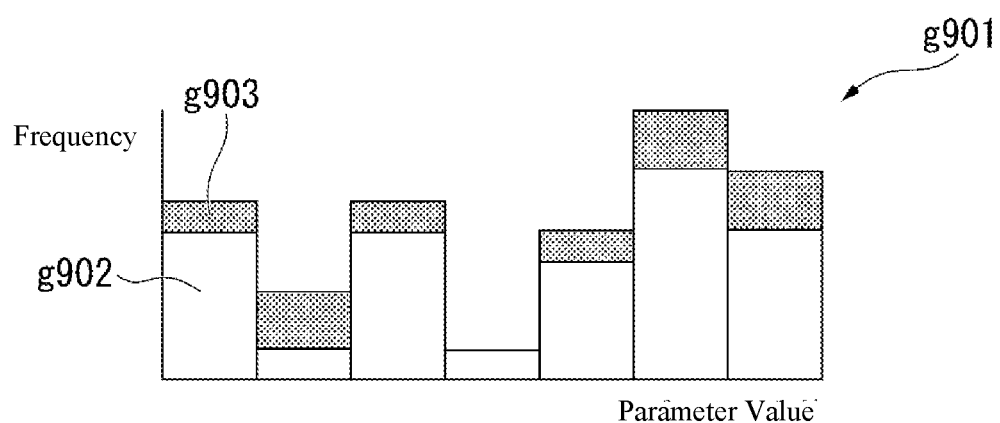
FIG. 11 is a diagram showing an example showing parameters using a histogram according to a comparative example.
Figure 11:
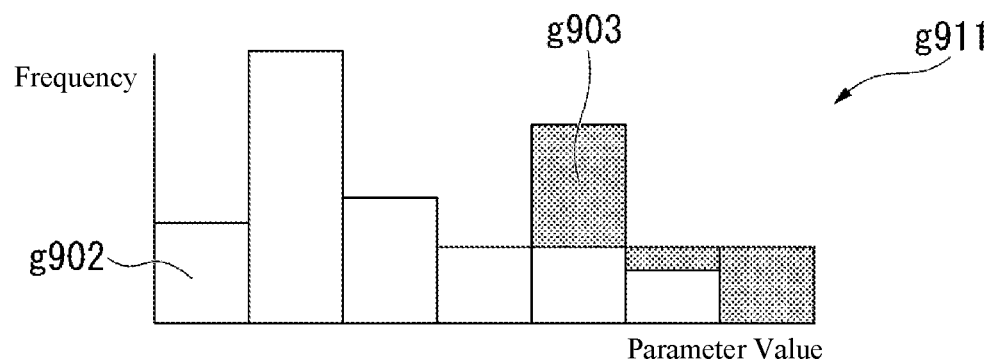

FIG. 11 is a diagram showing an example showing parameters using a histogram according to the comparative example.

A histogram g901 is a histogram of parameter 1 and a histogram g911 is a histogram of parameter 2. In the histogram g901 and the histogram g911, the horizontal axis is a parameter value (for example, values of 0 to 10 with intervals of 1), and the vertical axis is frequency. Note that frequency means the number of production batches having the same parameter value in a plurality of production batches. Furthermore, reference numeral 902 represents indicator information that is "good", and reference numeral g903 represents indicator information that is "bad".

In the histogram g911 for parameter 2, the distribution of "good" and "bad" is separated and biased, and as the value of parameter 2 increases the indicator tends to become worse. That is, it is understood that a large value for parameter 2 is possibly a factor for worsening of the indicator. However, in the histogram g901 for parameter 1, the distribution of "good" and "bad" is not separated nor biased, and therefore a trend cannot be found.

Figure 12:
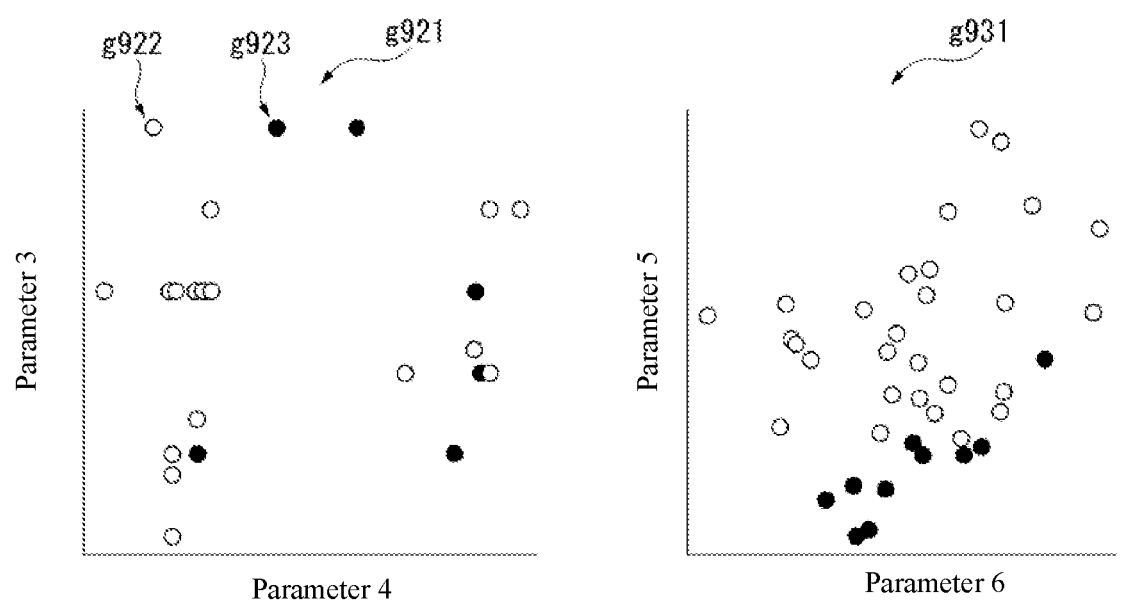
FIG. 12 is a diagram showing an example showing a correlation of two parameters according to a comparative example.

FIG. 12 is a diagram showing an example showing a correlation of two parameters according to the comparative example.

A correlation diagram g921 is a correlation diagram of parameter 3 and parameter 4, and a correlation diagram g931 is a correlation diagram of parameter 5 and parameter 6. In the correlation diagram g921, the horizontal axis is parameter 4 (for example, a value of 0 to 10), and the vertical axis is parameter 3 (for example, a value of 0 to 10). In the correlation diagram g931, the horizontal axis is parameter 6 (for example, a value of 0 to 10), and the vertical axis is parameter 5 (for example, a value of 0 to 10). Furthermore, reference numeral 922 represents indicator information that is "good", and reference numeral g923 represents indicator information that is "bad".

In the histogram g931 for parameter 5 and parameter 6, the distribution of "good" and "bad" is separated and biased, and it is understood that as the value of parameter 5 decreases and the value of parameter 6 increases, the indicator tends to become worse. That is, it is understood that a small value for parameter 5 and a large value for parameter 6 is possibly a factor for worsening of the indicator. However, in the histogram g921 for parameter 3 and parameter 4, the distribution of "good" and "bad" is not separated nor biased, and therefore a trend cannot be found.

In the method of the comparative example, the analysis supervisor must estimate parameters of factors by checking all created histograms and all correlation diagrams to check for trends for each parameter in this manner. However, the number of histograms and correlation diagrams increases as the number of parameters increases. Therefore, it becomes difficult for the analysis supervisor to see all output graphs, and it becomes difficult to judge which parameters influence the indicator for manufacturing.

Furthermore, in the method of the comparative example, when the narrowing down of parameters is, for example, carried out using machine learning, it is possible to accurately narrow down which parameters influence whether the indicator is good/bad if there is a large number of cases or production batches (for example, 100 thousand or more). However, in manufacturing processes performed at a factory, the number of production batches is general several dozen to several hundred. When the number of production batches is small in this manner, the precision of the machine learning does not increase, and accurate narrowing down cannot be achieved. Moreover, there is an issue in that it cannot be understood what the results of the machine learning mean physicochemically, and they cannot be used. Furthermore, when a portion of the distribution of "good" and "bad" of the indicator overlaps, it is difficult to separate using clustering processing.

Figure 13:
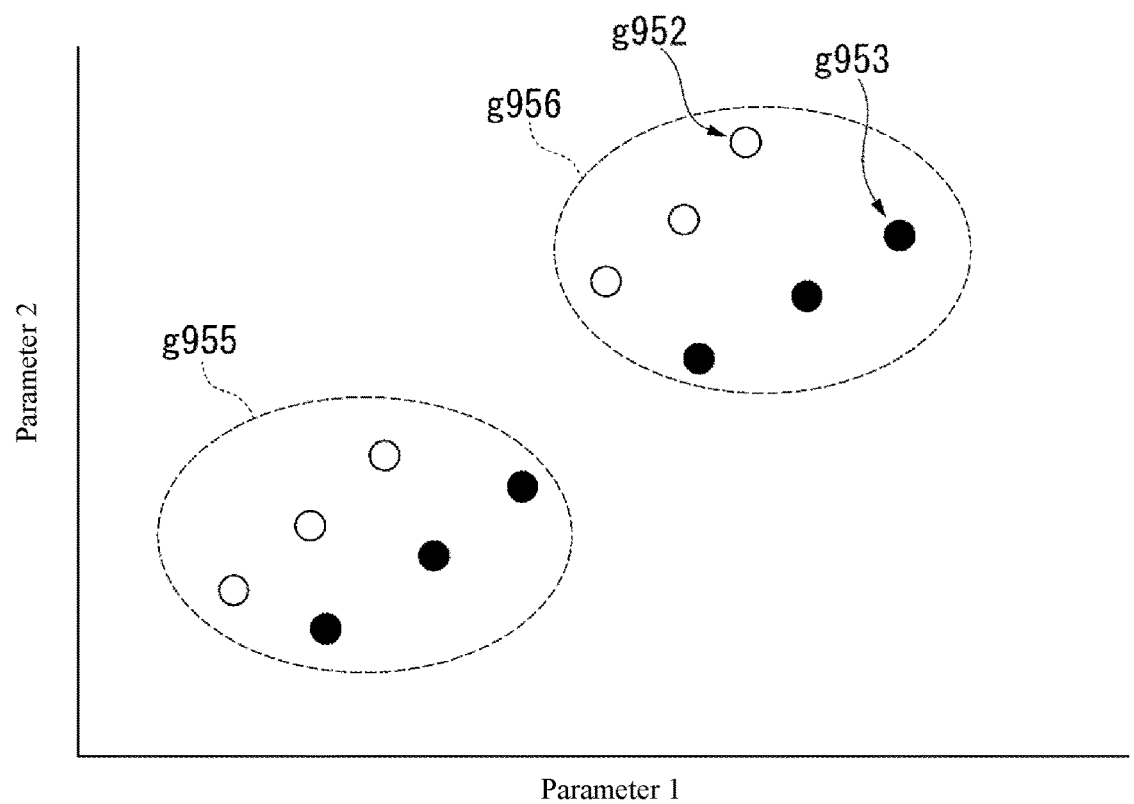
FIG. 13 is a diagram showing an example of data from a correlation diagram which has undergone clustering processing according to a comparative example.

Furthermore, in the comparative example, both "good" and "bad" indicators are used when creating the graph. Therefore, in a correlation graph such as FIG. 13, when, for example, clustering processing is performed, "good" and "bad" indicators are not separated, but groups g955 and g956 will be separated. FIG. 13. is a diagram showing an example of data from a correlation diagram which has undergone clustering processing according to the comparative example. Note that reference numeral 952 represents indicator information that is "good", and reference numeral g953 represents indicator information that is "bad".

In contrast, in one or more embodiments, indicator information that are "bad" are removed to find the approximation when calculating the correlation feature values, and therefore the incorrect grouping seen in FIG. 13 would not occur.

Modification Example

In the foregoing embodiments, examples are described wherein the parameter extraction unit 14 uses the correlation feature values to estimate a pair of parameters which influence the indicator, but it is not limited to this.

The parameter extraction unit 14 may use a second learning model for data for each parameter to extract one parameter if that parameter influences the indicator. In such a case, input at the time of learning is the data (production batch information, parameter information, and indicator information) for each parameter, and the output is the parameter which has an influence. Note that there may be several output parameters. For example, the parameter extraction unit 14 may create a histogram for each parameter as in FIG. 11 and extract one parameter which influences the indicator based on the bias of the indicators in the created histograms.

According to one or more embodiments, correlation feature values can be extracted using the foregoing method even when the analysis supervisor has no know-how in the domain. Note that the correlation feature values represent the level of scattering of the correlation. Note that level of scattering means the distance between the approximation and each data as described above. According to one or more embodiments, parameters influencing whether the indicator is good/bad can be narrowed down based on these correlation feature values even when there are few production batches or there are many parameters.

Furthermore, according to one or more embodiments, correlation feature values are calculated based on the approximation, which is the correlation between parameters, and the distance between the approximation and data of the parameters. According to one or more embodiments, even when it is difficult to narrow down parameters by machine learning using only parameters and the indicator when there are few production batches, it is possible to narrow down parameters which influence whether the indicator is good/bad based on these correlation feature values.

Furthermore, according to one or more embodiments, the level of scattering of the correlation can estimate what influences the indicator by using the extracted correlation feature values to perform machine learning. For example, it is possible to find from the data of the parameter values for each production batch that the indicator is good if temperature favorably rises when fuel is increased and that the indicator is bad when the temperature does not really increase when fuel is increased.

Furthermore, according to one or more embodiments, the analysis supervisor may check the output results, and there are few graphs to be checked. According to one or more embodiments, the analysis supervisor can look at the correlation diagram for parameters proposed by machine learning and check whether those parameters really influence whether the indicator is good/bad. For example, in the example in FIG. 8, even if there are several hundred parameters in the input data, this can be checked without any problem using a graph display function using only the two "correlation diagram of parameter 1 and parameter 2" and "correlation diagram of parameter 3 and parameter 4".

Moreover, as described above. According to one or more embodiments, effective feature values can be extracted even when the analysis supervisor has no know-how in the domain.

According to one or more embodiments, using the effective feature values can lead to accurate results using machine learning even when there are few production batches, and therefore the parameters can be narrowed down.

Note that in the foregoing example, an example is described wherein an approximation is calculated in a two dimensional correlation graph according to two parameters and the distance between the approximation and the data is calculated, but it is not limited to this. The correlation diagram may be, for example, three dimensional or more according to three parameters. The dimensions may be visible to the analysis supervisor, or, for example, may be five-dimensional or six-dimensional.

Furthermore, in the foregoing example, an example is described wherein indicator information can be one of two—"good" or "bad"—but the indicator information may be three or more. For example, when the indicator information can be one of three—"good", "average", and "bad"— the feature value extraction unit 13, for example, may remove "average" and "bad" and use only "good" from among the data to calculate the approximation, or may remove only "bad" and use "good" and "average" to calculate the approximation. Accordingly, the feature value extraction unit 13 may remove one or more from among the indicator information to calculate the approximation.

Instructions for implementing all or a portion of the functions of the data analysis system 1 according to one or more embodiments may be recorded on a non-transitory computer-readable medium (non-transitory CRM) which can be ready by a computer, and the instructions recorded on this non-transitory CRM may be read and implemented by a computer system to perform all or a portion of the processing performed by the data analysis system 1. Note that "computer system" as used here means an object including an OS and hardware such as peripheral equipment.

Furthermore, "computer system" means an object including a WWW system provided with a home page provision environment (or a display environment). Furthermore, "recording medium which can be read by a computer" means a portable medium such as a flexible disk, a magneto-optical disk, ROM, CD-ROM, or the like, or a memory device within the computer system such as a hard disk drive. Furthermore, "recording medium which can be read by a computer" includes those which retain a program for a fixed time such as volatile memory (RAM) in a client computer system or a server when the instructions are transmitted via a communication circuit such as phone lines or a network such as the internet.

Furthermore, the instructions may be transmitted from the computer system wherein the instructions are stored on a memory device or the like to another computer via a transmission medium or using a transmission wave in the transmission medium. Here, the "transmission medium" for transmitting the instructions means a medium having a function for transmitting information such as a communication circuit (communication line) such as a phone circuit or a network (communication network) such as the internet. Moreover, the instructions may be for implementing a portion of the functions described above. Furthermore, the instructions may be one that can implement the functions described above in combination with instructions already recorded in the computer system, or a so-called difference file (difference instructions).

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

1 . . . data analysis system, 11 . . . data acquisition unit, 12 . . . database, 13 . . . feature value extraction unit, 14 . . . parameter extraction unit, 15 . . . analysis results generation unit, 16 . . . output unit

What is claimed is:

1. A data analysis system, comprising:
a memory; and
a processor connected to the memory, wherein the processor:
  acquires data including:
    parameters related to a production element of a product produced in each of production batches, and
    an indicator for evaluating the product, and
  outputs, to the memory, the acquired data,
the memory stores, for each one of the production batches, the data including the parameters and the indicator associated with the parameters,
the processor further:
  selects, from the data stored in the memory, a combination of a plurality of the parameters;
  extracts, from data of the selected combination, data of each one of the production batches, wherein the extracted data fulfills a standard stipulated in advance;
  uses the extracted data to calculate an approximation that indicates a correlation of the selected combination;
  calculates, for each one of the production batches, a correlation feature value that indicates a distance between the data of the selected combination and the approximation;

extracts the parameters that influence the indicator based on the calculated correlation feature values via machines learning; and causes a display to display the extracted parameters.

2. A data analysis method, comprising:

acquiring data including:
  parameters related to a production element of a product produced in each of production batches, and
  an indicator for evaluating the product;
storing, in a memory, for each one of the production batches, the data including the parameters and the indicator associated with the parameters;
selecting, from the data stored in the memory, a combination of a plurality of the parameters;
extracting, from data of the selected combination, data of each one of the production batches,
  wherein the extracted data fulfills a standard stipulated in advance;
using the extracted data to calculate an approximation that indicates a correlation of the selected combination;
calculating, for each one of the production batches, a correlation feature value that indicates a distance between the data of the selected combination and the approximation;
extracting the parameters that influence the indicator based on the calculated correlation feature values via machine learning; and
causing a display to display the extracted parameters.

3. A non-transitory computer-readable medium storing instructions, wherein when the instructions are executed, a processor is made to execute operations comprising:

acquiring data including:
  parameters related to a production element of a product produced in each of production batches, and
  an indicator for evaluating the product; storing, in a memory, for each one of the production batches, the data including the
  parameters and the indicator associated with the parameters;
selecting, from the data stored in the memory, a combination of a plurality of the parameters;
extracting, from data of the selected combination, data of each one of the production batches,
  wherein the extracted data fulfills a standard stipulated in advance;
using the extracted data to calculate an approximation that indicates a correlation of the selected combination;
calculating, for each one of the production batches, a correlation feature value that indicates a distance between the data of the selected combination and the approximation;
extracting the parameters that influence the indicator based on the calculated correlation feature values via machine learning; and
causing a display to display the extracted parameters.

* * * * *